(12) United States Patent
Metcalfe

(10) Patent No.: US 7,233,915 B2
(45) Date of Patent: Jun. 19, 2007

(54) ELECTRONIC ACTIVITY AND BUSINESS SYSTEM AND METHOD

(76) Inventor: Alan Metcalfe, P.O. Box 587, Spring Hill, Queensland (AU) 4004

( * ) Notice: Subject to any disclaimer, the term of this patent is extended or adjusted under 35 U.S.C. 154(b) by 815 days.

(21) Appl. No.: 09/771,379

(22) Filed: Jan. 25, 2001

(65) Prior Publication Data
US 2001/0027446 A1 Oct. 4, 2001

Related U.S. Application Data

(60) Provisional application No. 60/231,069, filed on Sep. 8, 2000, provisional application No. 60/206,995, filed on May 25, 2000, provisional application No. 60/189,119, filed on Mar. 14, 2000, provisional application No. 60/177,918, filed on Jan. 25, 2000.

(51) Int. Cl.
*G06Q 30/00* (2006.01)
(52) U.S. Cl. .............................. 705/26; 705/9
(58) Field of Classification Search ............... 705/26, 705/9, 35–42; 707/9, 100
See application file for complete search history.

(56) References Cited

U.S. PATENT DOCUMENTS

| | | | |
|---|---|---|---|
| 5,615,269 A | 3/1997 | Micali | 380/49 |
| 5,794,210 A | 8/1998 | Goldhaber et al. | 705/14 |
| 5,966,697 A * | 10/1999 | Fergerson et al. | 705/26 |
| 5,970,475 A | 10/1999 | Barnes et al. | 705/27 |
| 6,035,288 A | 3/2000 | Solomon | 705/37 |
| 6,064,981 A | 5/2000 | Barni et al. | 705/26 |
| 6,067,531 A | 5/2000 | Hoyt et al. | 705/35 |
| 6,101,485 A | 8/2000 | Fortenberry et al. | 705/27 |
| 6,119,101 A * | 9/2000 | Peckover | 705/26 |
| 6,141,653 A | 10/2000 | Conklin et al. | 705/80 |
| 6,260,024 B1 * | 7/2001 | Shkedy | 705/37 |

(Continued)

FOREIGN PATENT DOCUMENTS

WO   WO 96/21192   7/1996

(Continued)

OTHER PUBLICATIONS

Origin Universal Services Limited, Universal News Services, Ambalink Launches Secure Online Shopping in the UK., Jun. 6, 1999.*

(Continued)

*Primary Examiner*—Frantzy Poinvil
(74) *Attorney, Agent, or Firm*—Duane Morris, LLP

(57) ABSTRACT

An electronic system for regulating activity that includes a standard user interface that requires all information presented in the system to be formatted in a standard (logical) manner that is designed to achieve results. The standard (logical) manner requires users to successively provide subject information, purpose information, and objective and time information relative to the activity. Standard user interfaces may be developed for a variety of business tasks and other activities All information is stored in individual files at user locations. The system handles facts and propositions in an equation solving manner. If a proposition is involved, selected information may be automatically forwarded to a searchable common market that contains summary information and links to the files. All discussion relating to a proposition is recorded, and agreement is recognized and recorded. Upon agreement, a fulfillment function is automatically launched. The fulfillment actions of the system are in accordance with the objective and time information provided by the user.

11 Claims, 7 Drawing Sheets

U.S. PATENT DOCUMENTS

| | | | |
|---|---|---|---|
| 6,401,080 B1 * | 6/2002 | Bigus et al. | 705/37 |
| 6,499,018 B1 * | 12/2002 | Alaia et al. | 705/37 |
| 6,868,392 B1 * | 3/2005 | Ogasawara | 705/26 |

FOREIGN PATENT DOCUMENTS

| | | |
|---|---|---|
| WO | WO 97/30407 | 8/1997 |
| WO | WO 98/57285 | 12/1998 |
| WO | WO 99/05629 | 2/1999 |
| WO | WO 00/17798 | 3/2000 |
| WO | WO 00/62232 | 10/2000 |
| WO | WO 01/03043 | 1/2001 |

OTHER PUBLICATIONS

Examination report from Foreign patent office, Oct. 10, 2005.

Yen, J. et al, "Intelligent clearinghouse: electronic marketplace with computer-mediated negotiation" Proceedings of the Twenty-Ninth Hawaii International Conference on System Sciences, Jun. 3-6, 1996.

Examination report from foreign patent office, Aug. 31, 2005.

PCT International Search Report of Serial No. PCT/IB01/ 00727, dated Aug. 17, 2001.

* cited by examiner

ELECTRONIC ACTIVITY AND BUSINESS SYSTEM AND METHOD

RELATED APPLICATIONS

This application claims priority from U.S. Provisional Application Ser. No. 60/177,918, filed Jan. 25, 2000, U.S. Provisional Application Ser. No. 60/189,119, filed Mar. 14, 2000, U.S. Provisional Application Ser. No. 60/206,995, filed May 25, 2000, and U.S. Provisional Application 60/231,069, filed Sep. 8, 2000, each of which is incorporated herein by reference in its entirety.

FIELD OF THE INVENTION

This invention relates to an electronic method for creating secure environments for conducting activities such as business, including the negotiation and fulfillment of contracts.

BACKGROUND OF THE INVENTION

Millions of people throughout the world now use the Internet as a faster and more cost-effective means of communication than previous methods of communication. Many see its potential as a medium for business. However only a very small percentage is yet able to use the Internet for business. The vast majority of Internet users cannot use the Internet for business because there is no readily available, electronic business ("e-business") system that can easily, safely, and affordably be adopted by the masses. The Internet (and the World Wide Web) is based on communications standards. However, an acceptable standard for wide-scale e-business has yet to be established.

If the world is going to make the transition to e-business, there must be a safe, secure, affordable and ubiquitous way for businesses large and small, to do e-business. There must be an effective e-business system based on enforceable laws that establish a level playing field for all users. The system must not only be affordable and appropriate, but it must be extremely user friendly. To be highly user friendly means that it must incorporate a high level of artificial intelligence. This means that it must be compatible with the way people think and do business.

To build such a system, there must also be a way to integrate the many and varied ways of business, including tying all the front office and back office functions together.

Without such a system, e-business will remain limited to the few who understand the increasingly complicated technology and those few who can afford to acquire that knowledge. Business-to-business sites were found by the Gartner Group to cost about $1.2 million to develop and to take at least six months to build. The custom coding of infrastructure is the biggest cost and time factor.

It should be noted, however, that even the minority that is now capable of using the Internet for business is now increasingly experiencing guerrilla style "hacker" attacks that are turning the Internet into a place of anarchy. Even Microsoft was successfully hacked in late 2000.

This is happening because there is no way to establish law and order on the Internet. The open architecture of the Internet works against any attempt to stifle free expression regardless of how such freedom is interpreted or expressed as Microsoft and even the most powerful governments in the world have found. Such unfettered freedom is not conducive to business. Business relies on enforceable law and order.

SUMMARY OF THE INVENTION

This patent application defines a fully integrated system for creating an environment in which e-business and other activities can be conducted in parallel to the Internet or a similar communications network in an acceptably secure and cost efficient way. It solves the following problems associated with currently trying to do business on the Internet.

Affordability—The need to custom build e-business systems is the major factor of their cost. This system establishes a common standard for e-business that significantly reduces the cost of custom building e-business systems.

Privacy and Security—Privacy, including information (data) security, is the primary concern of Internet users because it is now widely known that its is almost impossible to prevent hacker attacks in such an open environment. Custom built security systems for Internet communication are available, however they are expensive and not a part of any general purpose e-business system that is now generally available. This system establishes a safe and secure environment where users can maintain the highest levels of privacy through an in-built security structure that incorporates a public/private key encryption methodology. Public/private key encryption and electronic signature awareness is widespread throughout the Internet community. However, there is no easy way to introduce these security measures on a global basis. This System overcomes this problem.

Authentication—Information posted on the Internet cannot always be trusted because there is yet no easy way to guard against identity theft. It is impossible in most cases to authenticate the identity of the person with whom one is communicating on systems like the Internet. This undermines the trust factor that is essential to the establishment of e-business. This system easily incorporates authentication methodologies.

Law and Order—Business relies on law and order. Business succeeds only where and when there is an enforceable law that is common to all and creates a widely known and acceptable order. Where no such law and order exist, it is difficult for business to function. The Internet does not and probably cannot provide such an environment for business. The Internet therefore does not and cannot allow governments to maintain their essential legal and taxing systems. This undermines the stability of the global business community and is a major deterrent to the widespread adoption of e-business. This system is based on generally accepted operating rules and creates a secure environment where law and order can be established and maintained.

Integration—The current, common approach to commercializing digital technology is modular and disintegrated. Consequently, the integration of the many different computer systems and devices that have been developed is now a major concern of business and government. Most businesses also have numerous customer and supplier relationships that need to be integrated. The existing individual Web site approach now common to the Internet makes this difficult, if not impossible to achieve because Internet Web sites are rarely built according to a common design and there is currently no way to commonly connect Web sites on a controllable business basis. This system provides a holistic rather than a modular approach to digital technology and e-business and establishes a fully integrated e-business system that can be easily and cost effectively applied to any business. It also provides a central control mechanism that enables the integration of any number of business into local and wide area networks. This provides business managers with a simple and effective way to monitor and control any number of divisions, customers, partners and digital activities and devices within one system.

Expert Business Guidance—Most people do not know how to best manage their businesses and very few know how to conduct e-business on a generally acceptable global basis. This means that any attempt to establish an e-business standard for the Internet must include a significant level of artificial intelligence based on common rules of logic that apply to business. There is no evidence that anyone has yet attempted to create such a common logic. Existing general purpose Internet access systems also do not attempt to provide users with such business guidance or expert assistance. Any incorporation of artificial intelligence is left to costly consultants to custom build systems that most users cannot afford. The advice of consultants is also almost always varied and adds to the general confusion of business activity on the Internet. This system is based on operating rules that replicate the Law of Thought that describes the way people think to do business or any other activity. The Law of Thought is adapted here to provide users with an in-built logical business methodology that seamlessly, unobtrusively and intuitively guides the way they do e-business while it increases user confidence in e-business.

User Friendliness—Because existing e-business systems are disintegrated, modular (custom built), and are regularly upgraded (changed), they are generally complicated and require considerable training and retraining to achieve acceptable levels of operator efficiency. They are rarely intuitive because they are not based on any generally accepted standard. This is a major deterrent to the wide adoption of e-business, particularly among small and micro businesses that cannot afford regular updates and costly training and retraining programs. This system introduces maximum user friendliness because it is based on the Law of Thought that describes the logical way that people think and work that is common and intuitive to all. Users therefore need very little training to understand how to use the system.

Technological Stability—The modular, disintegrated approach to digital technology means that the technology is constantly changing. The rate of change is so fast in most instances that it is difficult for even the best and most wealthy businesses to keep-up. This is not conducive to the stability of e-business and means that most digital solutions have a very short life span. This system overcomes this problem by providing a common platform for business based on a model with wide application.

Financial Transaction Capability and Accountability— Transaction processing and accountability is an integral function of every business activity. It is essential to the orderly establishment of an electronic business world that businesses are fully and easily accountable to their owners and managers and are answerable to government taxing authorities. Existing general purpose Internet access systems do not provide an in-built financial transaction capability or any way to properly account for the activities transacted by these systems. Any incorporation of a transaction capability is left to costly consultants to custom build systems that most users cannot afford. This system incorporates transaction processing and accounting as an integral feature.

Customer Credit Arrangements—Customer credit arrangements an integral part of all business. Existing general purpose Internet access systems do not enable users to incorporate their customer credit arrangements into their online activities. Any incorporation of customer credit arrangements is left to costly consultants to custom build systems that most users cannot afford. This system incorporates a customer credit organizer as an integral part of the system.

Customer Relations Management and Protection—The current disintegrated approach to e-business is placing the long established and hard won customer relationships of many organizations at risk because it is extremely difficult to protect customer relationships on the Internet. The high opportunity for fraud and destructive and dishonest competitive practices places every company that now does business on the Internet at risk of damaging its customer relations and even losing its customers. This is disruptive to the world economy and is not conducive to good business practice. This system provides businesses with a practical and effective way to establish secure private networks that can be integrated with other secure private networks and the Internet in a way that allows them to control their customer relationships and still enjoy the benefits of e-business and the Internet.

Global Markets—Electronic business on a global scale requires a common global marketplace for products that are international in nature. Existing general purpose Internet access systems do not provide for the establishment of a structured global market. There are many modular database systems available for creating global markets and there is frantic activity to create online marketplaces. However, none of these markets are integrated or is capable of providing the level-playing field that is essential to a common global market. Therefore they can only serve to further distort the market and limit the potential of e-business and the global economy. This system creates fully integrated, common global markets as an integral feature.

Fair and Effective Search Engine Service. The existing domain (URL) name-based Internet is controlled by Search Engines that do not offer a true and fair service to all users. Long established business names mean little and the current system is clearly biased towards higher paying customers. This system places the emphasis on product files rather than domain names similar to the successful yellow pages directory concept. This provides a faster and more reliable method of matching sellers and buyers. It also gives every company the opportunity to compete on its merits and largely overcomes the trade in domain names.

In one aspect of the invention, there is provided an electronic system for regulating activity. The system includes a user interface means for determining the rights and abilities of users within the electronic business system and requiring a common format for transaction data used in the system, a common market permitting users employing the user interface means to locate propositions of interest and to negotiate transactions, and a central clearinghouse for authorization and authentication of users.

In another aspect of the invention, there is provided a method of data handling in connection with a proposed activity, comprising the steps of successively prompting a user for and receiving from the user who/what information relating to the activity, why/how information relating to the activity, and where/when information relating to the activity, recording received discussions relating to the activity, recording agreement between the user and another party, and, in a fulfillment stage, prompting and monitoring fulfillment steps in accordance with the where/when information.

DETAILED DESCRIPTION OF AN EMBODIMENT OF THE INVENTION

Figure 1:
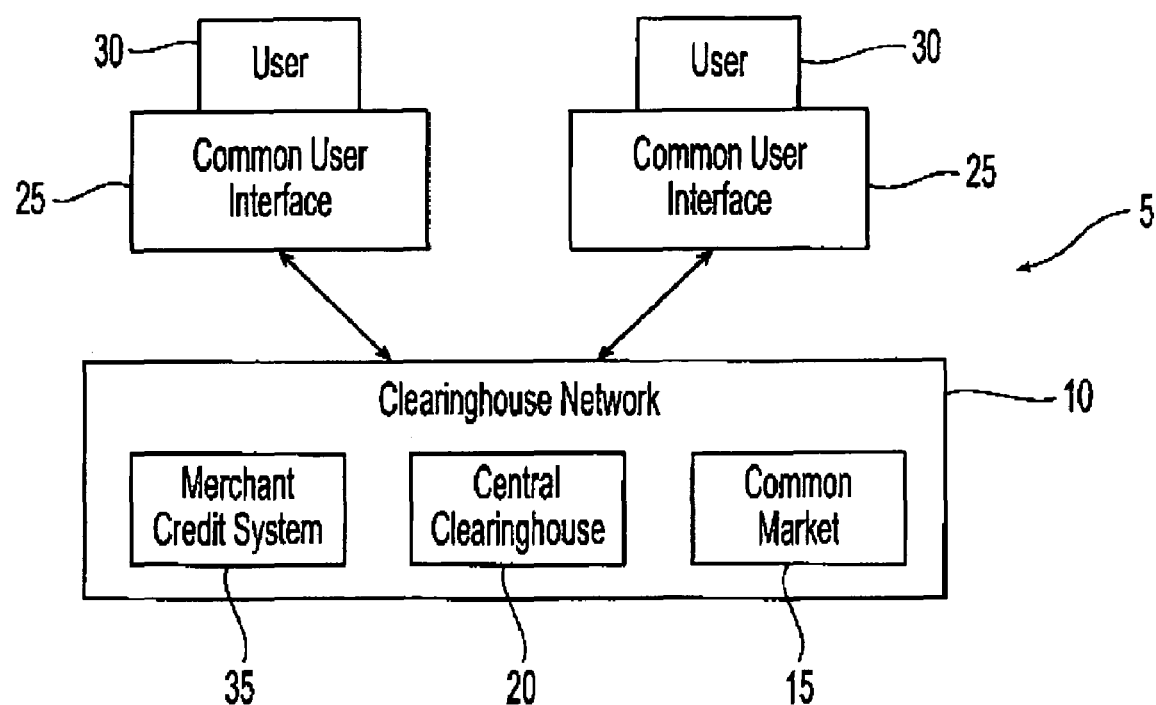
FIG. 1 is a schematic diagram of a system of the invention.

Referring now to FIG. 1, there is shown a schematic diagram of a system of the invention. The system 5 of the invention includes, within a virtual or actual private network, a clearinghouse 10, a common market 15, and a plurality of users 30. Each connection of a user 30 to the network 10 is via a common user interface 25 designed in accordance with the operating rules of the invention. Among its various functions the common user interface creates the content of the central clearinghouse and the common market and is used to operate both entities. Common user interface 25 includes a common background shell and secondary interfaces.

The common network of the system 10 is made up of computers, each of which includes one or more processors, memory devices, and input and output devices, running software to execute the methods of the invention. The computers may be linked to the Internet or another electronic network. The central clearinghouse 20 and the common market are linked to the network and all users through suitable secure connections but are not directly connected to the Internet. Any connection with the Internet or any other network is made through a separate secure connection to protect the integrity of the system. Each user 30 represents a computer of a user of the system and must be registered with the central clearinghouse to use the system and be granted certain access rights. Overall access rights are controlled by the central clearinghouse whereas individual user applications of the system control their own access rights. Users may be individuals, entities, or other systems. Each user 30 is connected through a copy of the common user interface and a suitable secure connection to the network 5 Any suitable secure data connection may be employed. Examples include the use of secure socket technology in transmitting data across the Internet. All data input and output is exchanged through the common user interface 25. The common user interface is designed to complement the business rules of the system, as explained below. The common user interface has the function of ensuring that all data is formatted and filed in a standard intelligent way. The common user interface may be in the form of software running on a user computer 30, which causes the processor of user computer 30 to execute specified instructions as explained below. Alternatively, the common user interface may be in the form of software or a combination of software and hardware and may be displayed on or employ a handheld device. The user may have a thin client device, with the common user interface running on a server remote from the thin client device.

The common market 15 uses the software of the system and the common user interface to create a global market for potential transactions that users 30 may wish to enter into and may wish to advertise globally throughout the system. The common market is a system of lists or indices of products, services and other offerings identified by remote resource locators that link files created by the common user interface and held by users to the common market. As information is systematically created by virtue of the common user interface 25, it is filed into individual files and a remote resource locator or tracking code is created for each file that may be connected to the common market. Access to files may also be controlled by various levels of access rights granted to individual users. The data making up the common market is preferably maintained at a central server; it will be appreciated that the data may be duplicated in mirror servers or divided among multiple servers.

The central clearinghouse 20 has the functions of maintaining records for each user, checking and authenticating users and authorizing access and transactions throughout the system. This feature of the central clearinghouse 20 may be used to create a merchant credit system 35 to permit exchanges of credit and barter among users without the need to access the banking system. It may also be used to create an electronic voting system, or wherever there is a need to securely authenticate the rights of various users or to regulate access to various devices. The central clearinghouse is linked to relevant bank systems to facilitate credit card processing and other transfers among bank accounts of users.

Figure 2:
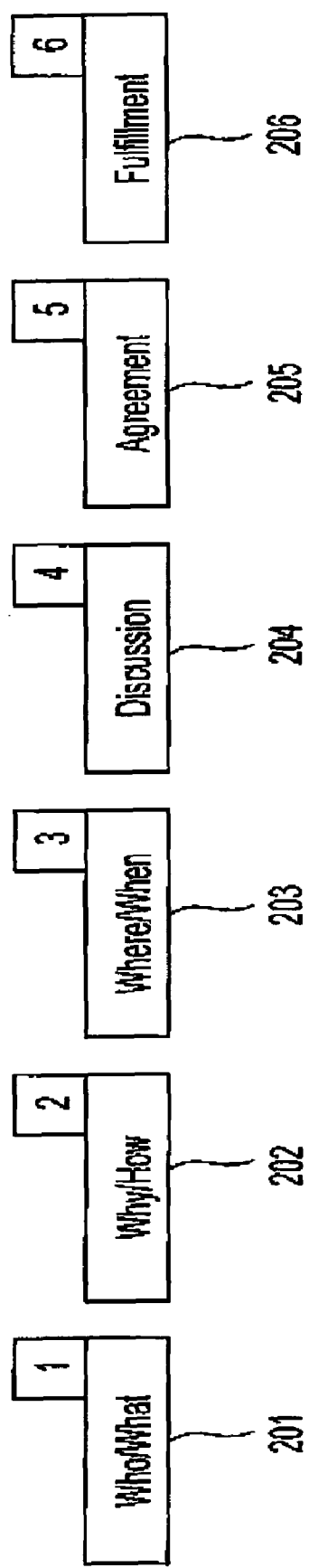
FIG. 2 schematically depicts categories of information for use with the invention.
Figure 3A:
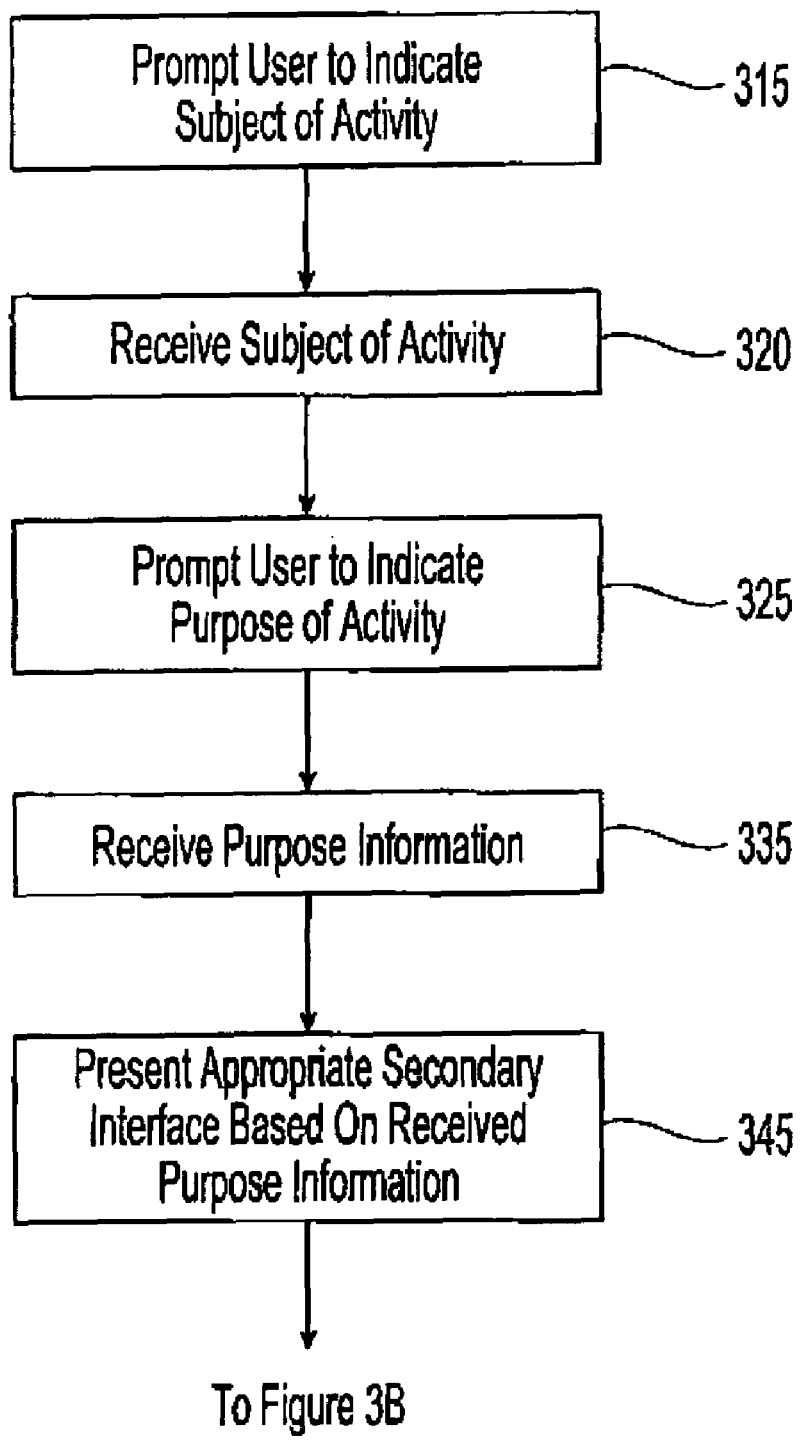
FIGS. 3A and 3B are a flow diagram depicting a process flow according to the invention
Figure 3B:
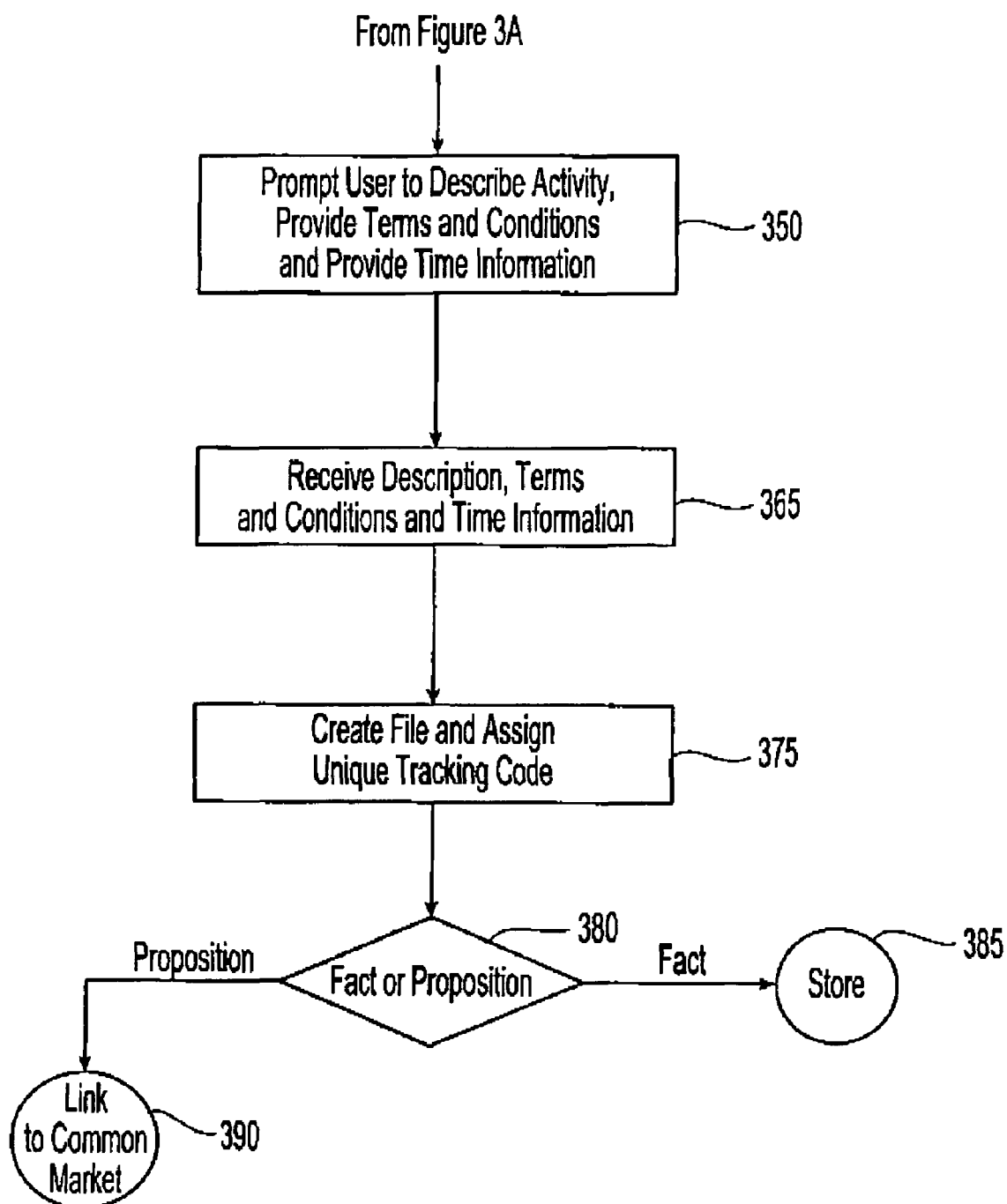

The system operates according to operating rules that give the system a degree of artificial intelligence and ensure its user friendliness. The operating rules function as a logical interactive script or workflow for processing the various activities of users and may be designed into the common user interface or they may be located on a remote server to facilitate network computing. Throughout the system, all activity reflects the workflow of the operating rules. The operating rules may be contained within separate files are as set forth in summary in FIG. 2. The operating rules are designed to allow the system to process all activities as either facts or propositions. The operating rules reflect a question and answer mechanism and are 1) who/what 201, 2) why/how 202, 3) where/when 203, 4) discussion 204, 5) agreement 205, and 6) fulfillment 206. It will be appreciated that equivalent terminology may be employed to suit various applications. Structuring the operating rules in this way provides an intelligent standard framework for inputting and outputting all information to and from the system. Users are permitted to put information into the system and take information out of the system by way of secondary interfaces designed to interact with the operating rules and thereby benefit from the logical workflow. Secondary interfaces are loaded into the common user interface as requested by the user or as part of the process of the operating rules. Secondary interfaces prompt users to input information in specific fields and formats. Secondary interfaces may prompt the user to correct or supplement information if information that is not in a proper format is input, or if one or more required fields are skipped. Secondary interfaces function like templates or forms in this regard. The interaction of the secondary interfaces with the operating rules provides secondary interfaces with a level of artificial intelligence that is important to user friendliness. Secondary interfaces are required for each activity including interfacing with any device or legacy third party system. Secondary interfaces must be designed to interface with the operating rules to operate within the use of the operating rules will now further be explained with reference to FIG. 3. FIG. 3 is a flow chart depicting a the process or workflow according to the invention. At the outset, the interaction between the common user interface and the operating rules, as that interaction is embodied in software running on the user's computer, prompts the user to identify whether a new transaction (a proposition) or an existing transaction (a fact) is involved. If the activity involves filing an existing record (a matter of fact) an appropriate secondary interface is provided and the user is prompted to indicate the subject, in the who/what field 201 of FIG. 2, of the activity, as indicated by block 315. This is the first stage of the operating rules. The subject (who/what) of the transaction may be one of a number of predetermined selections. The subjects may include the identity of a particular person, group or organization, goods, services, technology, concept, industry, vertical market, or other subject matter. The user interface receives the subject of the activity from the user, as indicated by block 320.

The user interface then prompts the user to identify the purpose of the activity, why it is to be used, as indicated by block 325. This is the first part or the question aspect of the second stage of the process of the operating rules that controls how secondary interfaces gather information about a transaction. This aspect corresponds to why/how 202 of FIG. 2. The system may provide a list of possible responses, or make a list of possible responses available to the user on request at this point. For example, a pull-down list of alternative purposes may be presented. Examples include general data entry, general business, personal-private, personal-business, and personal-departmental. The system then receives the purpose of the transaction, as indicated by block 335. The user interface may also at this time prompt the user to identify at this time if the transaction is private or public, or the level of privacy or availability to the public, as appropriate. The system may provide a number of levels of privacy or publicity, and furnish users the opportunity to indicate the level of privacy or publicity required to access each transaction, or provide rules for determining the level of privacy based on the purpose of the transaction. The system may provide the user the opportunity to set levels of privacy or publicity available to other users or classes of users. The system may designate levels of privacy for transactions, based on the purpose information furnished by the user and existing rules.

When the user identifies the purpose (and the system receives the purpose), the system responds by presenting the appropriate secondary interface to facilitate that activity, as indicated by block 345. This is the second part or the response part of the second stage of the process of the operating rules that controls how secondary interfaces gather information about a transaction. The system has the potential to make available an unlimited number of secondary interfaces to the user. The design of the secondary interfaces assists users to systematically gather information and produce reports, and other documents. The use of secondary interfaces permits the linking of the front end of a business to the back end of a business or finding the answer to the question. The operating rules provide the basis for secondary interfaces to do this. Secondary interfaces need to be developed for different users, to reflect the various ways that the system can be used. The selection of secondary interfaces is determined by why the user wants to use the system. Matching files containing lists of why the system required and secondary interfaces for how the system can achieve these goals may be maintained by the system to assist users and facilitate such selection. When the system has received a purpose from a user, or in other words, knows why it is to be used, it selects a secondary interface corresponding to the purpose indicated by the user. The selection may be made based on information in matching files. For example, if the purpose for which the system is to be used is data entry, a secondary interface for data entry is provided. If the purpose is general business, a secondary interface for general business is selected. If the purpose is personal-private, a secondary interface for personal-private activity is selected. If the purpose is to sell a product, a secondary interface for product selling is selected. The system then presents the selected secondary interface for to the user through the common user interface.

When the user has been presented with the appropriate secondary interface, the system then prompts the user to describe the objective or goal of the activity (where it is required to be when completed), provide terms and conditions, and provide time information, as indicated by block 350. This is the first part or the question part of the third stage of the process of the operating rules that controls how secondary interfaces gather information about a transaction. This third stage corresponds to the where/when block 203 of FIG. 2. This third stage relates to the status where the activity is required to be at a given time, and responses to this question may be supported by business plans, product descriptions or other forms of documentation that describe the objective of the activity. Exhibits may also be attached to the transaction at this stage. Exhibits may include video, audio, multimedia or other presentations in digital form to enhance the transaction. As noted, the system should also prompt the user at this point to provide the proposed terms and conditions of agreement for the transaction in question. The proposed terms and conditions of agreement may be in the form of a text file, or selected from a menu of agreements for a particular class of transaction. The provision of proposed terms and conditions of agreement provide a basis for negotiation and are essential to the fulfillment of the transaction and therefore should include details of how the agreement should be fulfilled once agreed. Details will vary from product to product and buyer to buyer. For example, if the user interface has been designed to support a wholesaler of a particular product, the fulfillment conditions may include directing instructions to a warehouse location to package an ordered quantity when known, to use a particular shipper, to provide confirmation when the order is shipped, and to place orders with specific suppliers if quantities in stock are not sufficient and these terms and conditions may be varied during negotiation from buyer to buyer.

When the user has completed the where part of the secondary interface, the system then prompts the user to enter information relative to the time or times when the transaction is to be performed. This is the second part or the response part of the third stage of the process of the operating rules that controls how secondary interfaces gather information about a transaction. The system deals with proposed times and actual times to reflect facts and propositions. Proposed times are necessary for scheduling when a proposition may be heard or negotiated in the case of a court hearing or creating a diary of proposed events. Actual times are times when the event actually occurs or must occur in the example of an application to use the system to control devices that must be turned on or off at a specific time. A calendar or a list of periodic times may be presented to the user at this stage to assist in the time selection process. Periodic times may be every hour, every day, every week, every month, every year, or some other period of time as determined by the user. When an event actually occurs is the actual time of the event. The system should also record the actual time of every event for tracking and accounting purposes. The individual file structure of the system enables this Secondary interfaces assemble all information relative to a transaction into an individual files in the user's database that may be part of the user's computer or they may be held remotely to the user's computer. The creation of individual files is critical to the recording of actual times when events occur and the tracking of transactions throughout the system. The system database that stores information relevant to the common market and links the common market to individual user files may be associated with the clearinghouse or held separately. The step of storing information and creating a file is indicated by block 375. A unique tracking code or resource locator is created for each file at the time it is created based on the time of creation of the file to enable each file to be individually identified and tracked throughout the system. This is necessary for tracking and accounting for transactions throughout the system. The tracking code is based on a formula designed to assure that no two files may have the same tracking code. For example, every tracking code may consist of both the time of creation and information uniquely identifying a location of storage. This tracking code is the remote resource locator that is used to establish the common market. It provides third parties with a direct link to resources held in individual files on user computers. This aids the search for information process.

If the transaction is in the nature of a proposition, rather than a fact, the final step is to create a link to the common market, as indicated by blocks 380 and 390. If the transaction is in the nature of a fact, the transaction file is complete and may be stored with a unique tracking number, as indicated by block 385. At this stage the interface prompts the user for the proposed terms and conditions of agreement. The terms and conditions may be in the form of a text file containing an agreement, or selected from a menu for a particular class of transaction. At this stage, the user interface also prompts the user to enter all information known at this time required to achieve fulfillment. The information provided will vary depending on the specific user interface. For example, if the user interface has been designed to support a wholesaler of a particular product, the fulfillment conditions may include directing instructions to a warehouse location to package an ordered quantity when known, to use a particular shipper, to provide confirmation when the order is shipped, and to place orders with specific suppliers if quantities in stock are not sufficient.

All information relative to a transaction or activity is stored in an individual file. Preferably, a unique tracking code is created for each file based on the time of creation of the file and the location of the file. The system will have assigned unique identifiers to each storage device associated with the system.

The difference between facts and propositions under the design of this invention is that propositions have to be negotiated and facts do not. For example, if the activity involves the entry of existing or fixed information such as a diary entry or the recording of existing records, the transaction will be characterized as a fact. If the activity involves the creation of offers to sell or solicitations to purchase products or services, the transaction will be characterized as a proposition. In an application of the system for a law court, a case that has to be heard will be considered a proposition, whereas a case that has been heard will be treated as a fact. Facts are activities that do not require a response. Propositions are transactions, such as offers of a product or service that require a hearing, negotiation, or a response involving another party or entity.

For activities that constitute propositions, the system creates a forum file associated with the activity file, to record all communications relating to the that activity. This is the fourth stage of the process of the operating rules and controls how secondary interfaces facilitate the negotiation or hearing of a transaction. This stage corresponds to discussion 204 of FIG. 2. The forum file is stored locally in the user's database as part of the individual transaction file, and is normally accessible only to the user. In the example of a court case however, the record of the hearing is a forum file and is often a part of the public record. Any communication between the parties in a transaction, such as questions and counteroffers, or evidence in a court hearing, are recorded in the forum file. Any communications directed by the user in response to such received communications associated with the activity are also recorded in the forum file that facilitates discussion between the parties in a transaction.

The fourth stage of the process of the workflow of the operating rules is the negotiation stage. Negotiation may be between humans or other systems, or in the case of mining a database, it may involve a search of the entire information held within the system. The proposition or question on offer may be communicated directly to selected users employing secure communications and smart agents or information relating to the proposition may be acquired through the common market. Preferably, the common market does not store a copy of the complete information pertaining to the proposition. While storage of all of the information is possible at the common market, the transmission and storage of such information would ordinarily be undesirable. Rather, the interface selects summary information for provision to the common market in accordance with predetermined criteria. The selected information must include the identification of the file that contains the information in the transaction file that is designated as available to prospective respondents. The criteria may call for storage in the common market of information identifying generally a product or service offered, or may be more detailed, such as identifying particular products by part number code. The identification of the file containing more detailed information is in the nature of a resource locator or tracking code.

Users access information through established supply chains or networks or they may search for products, services, or other offerings on the common market. One or more users may elect to respond to a proposition. A user may accept or reject any offer made with reference to a proposition, or may respond by a counteroffer or comment or question aspects of the offer. Comments, questions, and counteroffers are collected in the forum file of the user that created the proposition and create a record of the activities associated with this proposition.

Figure 4:
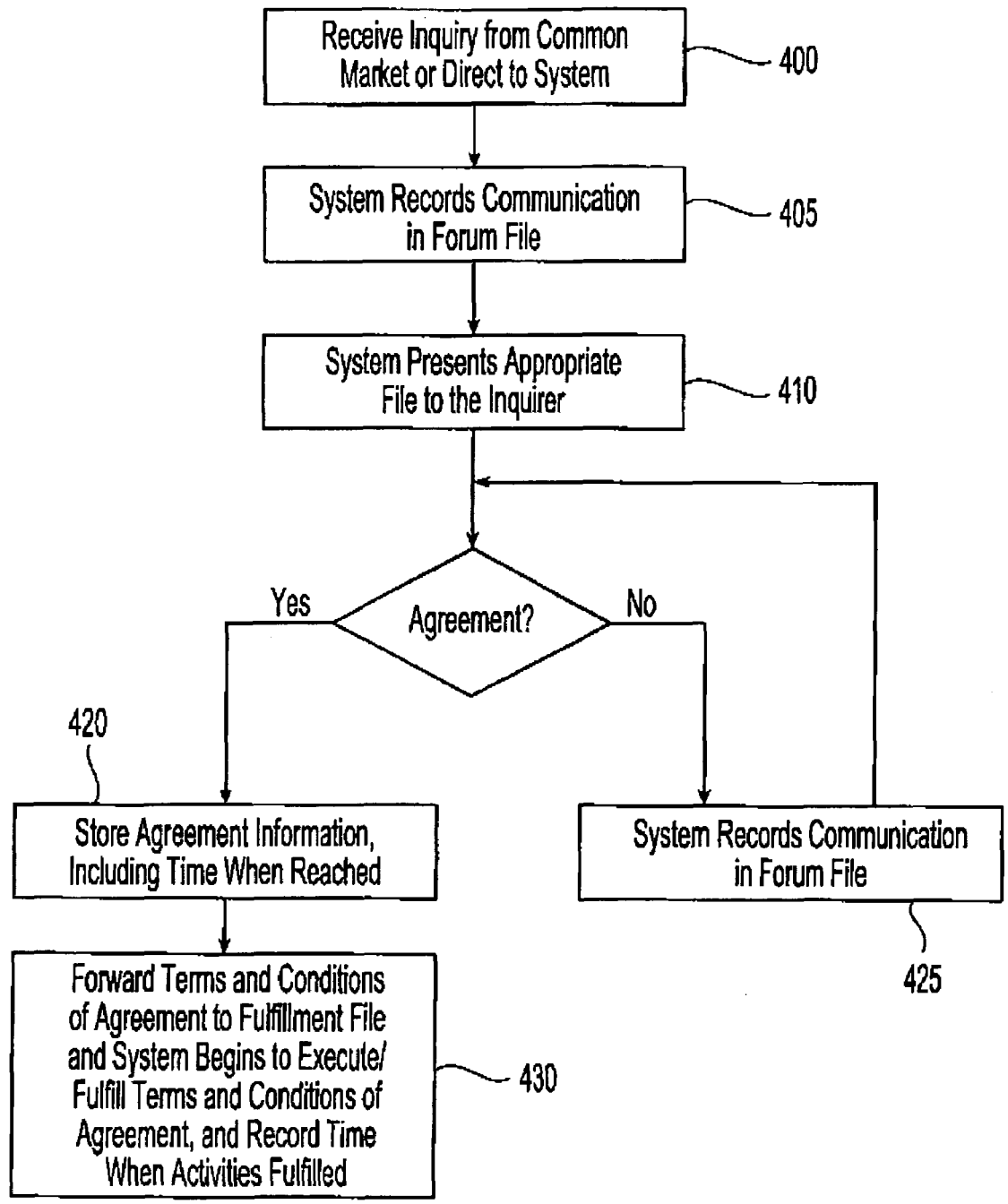
FIG. 4 is a flow diagram depicting a process flow according to the invention.

At this stage, as indicated in FIG. 4, at block 400, the user's system may either receive an inquiry from the common market or directly from the user or from another user. The system records all communications in the forum file, as indicated by block 405. The system also presents the appropriate file to the inquirer, as indicated by block 410.

The fifth stage of the workflow of the process of the operating rules is the decision stage. This corresponds to agreement 205 of FIG. 2. If a user indicates agreement on the terms and conditions presented as part of the proposition, then the secondary interface records agreement at that point in time in the file of the relevant activity, as indicated by blocks 415 and 420. It will be appreciated that if the activity is in the form of a request for proposals, or otherwise indicates that the activity is not an offer available for acceptance by anyone, the user will need to respond in order for an agreement to be formed. If agreement is not indicated, then the user interface continues to record communications in the forum file, as indicated by the line labeled NO leading from decision block 415 to block 425. The security features of the system that require every user to register and establish its credentials provide an assurance that an electronic acceptance is reliable. For accurate accounting purposes the time of the agreement should also be recorded in the central clearinghouse. The agreement closes the negotiation file, and automatically results in the launch of tasks required by the fulfillment file as indicated by block 430. This is the sixth and final stage of the workflow of the operating rules, and corresponds to fulfillment 206 of FIG. 2. To activate the fulfillment stage, the terms and conditions of agreement between the parties are forwarded to the fulfillment file for. The fulfillment file of the operating rules systematically checks the terms and conditions of agreement to fulfill the obligations of the agreement which may include the delivery process, the payment process, and any notices that have to be sent to the various parties, or reports that have to be generated as a result of the fulfillment process. By way of example, the system may send notices, create work orders, create purchase orders, and report to specified users. The system may launch digital devices during the fulfillment process to perform certain functions To facilitate negotiation and agreement, the system may use a variety of standard agreements. The system should also require users to enter into agreement with the operator of the system to protect the interests of the operator. Examples include the transaction fee payment agreement. This agreement allows the common market to list product information on a non-exclusive basis. By listing product information on the common market, this means making available to the public or the general community of users references to information stored at user computer locations. Other standard agreement may assist the user to establish the terms and conditions of payment and delivery for sales made through the system.

The agreement between the system operator and the user should also allow the operator or system administrator to track all transactions throughout the system.

A project option and financing agreement should also be provided for a project requiring financing. This agreement should include the terms and conditions of the financing and the commission sharing arrangement. In this type of transaction or any other transaction, taxation may be deducted and paid to the relevant authorities and agreement with parties and the operator should be agreed to allow for this to happen where required. The individual file structure of the system and its ability to track each individual transaction facilitates the accurate gathering and payment of taxation on an item by item basis.

The common user interface controls the rights of users within the system. The common user interface may also permit connection to existing sites on the world wide web The common user interface connects the URL of their existing web site through a specific secondary interface. The use of a specific secondary interface allows connection to the world wide web or any other network to be controlled. This is essential to the security of the system.

The common user interface consists of two parts, the common background shell of the interface and secondary interfaces that are loaded into this shell. Secondary interfaces may be stored locally on the user's system or on a remote server and downloaded as required. Secondary interfaces are required for all tasks and for all connections to third party software or digital devices used by the system, and all connections to legacy systems. All secondary interfaces must be compatible with the operating rules, with only the content changing. Common functions are standardized throughout the system and may be represented by buttons or any similar interface.

Ideally a standard interface template is should be made available to developers of secondary interfaces. The standard interface template will establish the parameters of the interface so that it will interact with the operating rules and the common user interface used by all users. All a developer then needs to do is create the content of the secondary interface corresponding to the task for which the interface will be used. To gain the best benefits of the system, secondary interfaces are preferably developed for each task. This allows tasks to be monitored and function independently. Each business organization and division that has users of that organization that wishes to use the system will need to develop their own applications of the system to suit their specific requirements. The workflow of the operating rules reflect a question and answer mechanism that is basically described as 1) who/what, 2) why/how, 3) where/when, 4) discussion, 5) agreement, and 6) fulfillment or as these words may otherwise be interpreted to suit various applications. This logical structure is an equation solving mechanism designed to enable the system to apply to any business or any digital activity involving a question and answer, action and reaction, cause and consequence, fact and proposition type of mechanism. Secondary interfaces may be developed that differ from the common interface in as little as in the interpretation of the basic description of these steps, or may require extensions of the content of the standard secondary interface but they will work so long as they related to the essence of the workflow of the operating rules. Secondary interfaces are preferably developed to corresponding to with each form in a business that is currently conducted either using paper or using discrete business software to input or output information.

Additional files related to the system will now be discussed. All information that is entered into the system is concurrently sorted and allocated into its appropriate file within the system. The function of sorting and allocation is accomplished by suitable programming in the operating. This gathering and sorting of information simplifies the creation of features like diaries and address books, and also activities like budgeting, forecasting, market analysis and other planning and accounting activities. The diary of the system is a calendar-based secondary interface designed to maintain the record of times when events of any description occurred or are scheduled to occur. Each user has a separate diary. The address book of the system relates to an index of all user files within the system that are related to the user may contain such personal details as the user's access rights, voting rights and credit arrangements where merchant credit is involved.

A specific secondary interface is required to output all information from the system. Once such secondary interface for outputting information may be is an accounting interface. This interface may be used to access and employ budgeting information. Other secondary interfaces may be developed to output information into tax returns or any other form that a user may require. A secondary interface may also be developed to mine information systematically from the system and report on trends or demographics within the system.

The central clearinghouse is a variation of the basic system template. It provides a number of functions including management of the network employed by the system, maintaining records of transactions and responding to queries relating to access rights to various features of the system, management of the user authentication process, and management of the user authorization process. Each user, upon registering with the system, creates a user profile that is stored in a separate user file in database of the central clearinghouse. The user profile includes information used in authenticating the identity of users and authorizing their access rights throughout the system, including credit rights and voting rights if applicable. In a preferred embodiment, when any user signs on, authentication information must be provided to the central clearinghouse, and the central clearinghouse must confirm that the authentication information matches the authentication information stored in the corresponding user profile before access will be granted. The central clearinghouse is preferably accessed only by users of the system, and should not be directly accessed via the Internet or any other network.

The merchant credit exchange is an application of the system's security, authorization, and authentication system. It is created by a specific secondary interface. The merchant credit exchange allows businesses to provide credit to their customers within the system. Files are created for each participating business and customer, which files are preferably maintained by the user's computer system with relevant records held on the database of the central clearinghouse for monitoring, accounting, and billing purposes. Participating merchants must agree to the terms and conditions of the merchant credit exchange before accepting any credit transactions. Users who employ the merchant credit exchange are responsible for creating their own credit terms and conditions, and managing their own credit extensions and collections. The merchant credit exchange provides users with an alternative to credit card, electronic funds transfer, and allows them to maintain customer relationships based on hard copy check payment against extended credit.

The common market is another variation of the basic system template that may function as a single market or as an exchange of exchanges (a market of markets). Users create the common market by establishing a link between their product information file and the common market at the time they create the product information file. At that point they choose to either hold their product information locally for display through their local application of the system, or they can also make it more widely available to the public through the common market. This method of creating a central market avoids the need for the common market to hold product information. Instead, the common market is an index of brief descriptions generated by the tracking codes that connect to product information files held remotely by users.

An important secondary interface, which also may be deemed a template or a form is that which facilitates the online sale of products and services. When the who/what purpose for using the system is a product of any kind, and the why is to sell the product, the system presents the product information form. This secondary interface creates a product information file. Product information files may include smart agents that perform specific tasks for this file such as global information accessing or matching sellers and buyers. The secondary interface for product information files also fulfills a number of other important purposes.

It creates a Product Profile for display so that buyers can see what the seller has to offer.

It gives users the option to list the Product Profile on the Common Market.

It provides a basis for rating Product Profiles. Rating may help buyers evaluate a Product Profile listed on the Common Market.

It provides the basis for matching sellers and buyers.

The system's standard interface structure benefits the recovery of information within the system for the same reasons that it benefits the inputting of information. To recover information from the database, the user simply selects the relevant Secondary Interface. Secondary interfaces can be used to produce activity reports and any other back office forms and reports that a business, or a court, other organization, or a system, may require. The system could provide a standard set of secondary output interfaces that may be customized by users as required, such as Work Order Form Invoice Statement for Payment of Account Information Request Work Reports Activity Reports for Advertisers A secondary interface for e-mail should be a standard feature of this system. This secondary interface is used for personal (private) and business e-mail. It should complement the filing system and allow users to separate their private affairs from their public (business) activities. Incoming and unsolicited e-mail may be appended to existing files or new files may be created to store such mail. The e-mail interface should allow for normal cut, copy, paste and save capabilities that allow users to transfer information contained within incoming e-mail to be stored where appropriate in the system. Access Rights control what users can do within the system. All users must have a registered copy of the common user interface and access rights to operate within the system. They will also need to establish their credit arrangements if they wish to trade on-line with one or more merchants (suppliers) using merchant credit. Users establish their access rights and their merchant credit details by registering with the central clearinghouse. Where a group of users are involved, one person should be appointed to control the issuance of access rights and merchant credit.

A new user must register to access the system. To do this a user must get a copy of the common user interface either on some form of digital storage disk, or it may downloaded from an on-line service such as the Internet, or it may come bundled with their computer.

When an unregistered copy of the common user interface is received and opened the secondary interface called the registration form should appear on the screen. This form must be completed and processed before the system can be accessed. The common user interface must be connected to the system network during the registration process to enable processing. Information provided in the secondary registration interface enables a user's profile (file) to be created within the central clearinghouse for the user. The user profile file contains essential private/personal information such as name, contact details, access rights, and credit details, that the system needs to function and authenticate transactions instigated by the user. This information may relate to an individual or a corporation and must be able to be up-dated (refreshed) by the duly authorized person. In the event that the user is a corporation, organization or network of users, separate files need to be created for all personnel that are authorized to use the system. Users may part of the corporate user. However they may also have personal merchant credit and access rights beyond those granted by their employer.

When the registration form is completed, uploaded, processed, and accepted, the user's unique tracking code is created and the latest version of the common user interface may then be downloaded to the user's machine, if necessary. For security and authorization purposes, a unique user tracking code must be allocated to every user at the time of completing the registration form. The tracking code is created from the user profile, or may be generated by a private key/public key generator. It relates to the user's file within the system. The user's tracking code is used to identify the user [for electronic signature (e-Sign) purposes] and to assist in the tracking of the user's activities within the system. A copy of all user tracking codes is held within the central clearinghouse.

For added security, the user tracking code may also be written to a user security disk (key) that each user must subsequently use to open the system. Users must then insert their user security disk and be connected to the central clearinghouse for authentication before they can operate within the system. The insertion of their user security disk converts their common user interface into a type of personal on-line credit vehicle.

At the time of insertion, the user's public key information on the user security disk (key) is matched with the user's profile that is kept in the central clearinghouse to authenticate a user's access rights. In addition to the user security disk, the user access interface may also require additional basic security questions before reactivating, such as mother's maiden name and date of birth. For added security the user security disk may also be combined with biometrics.

Figure 5A:
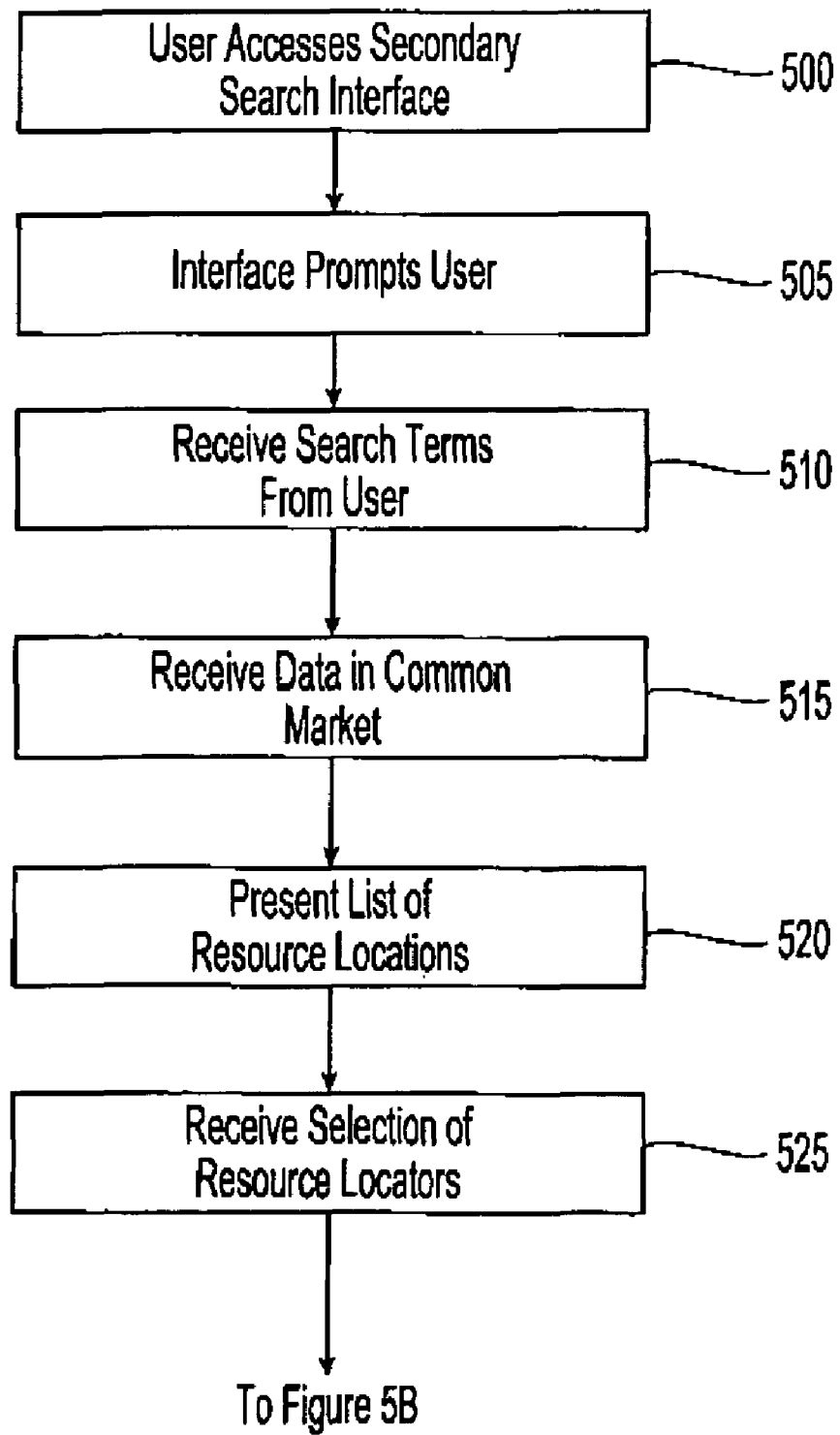
FIG. 5 is a flow diagram depicting a process flow according to the invention.
Figure 5B:
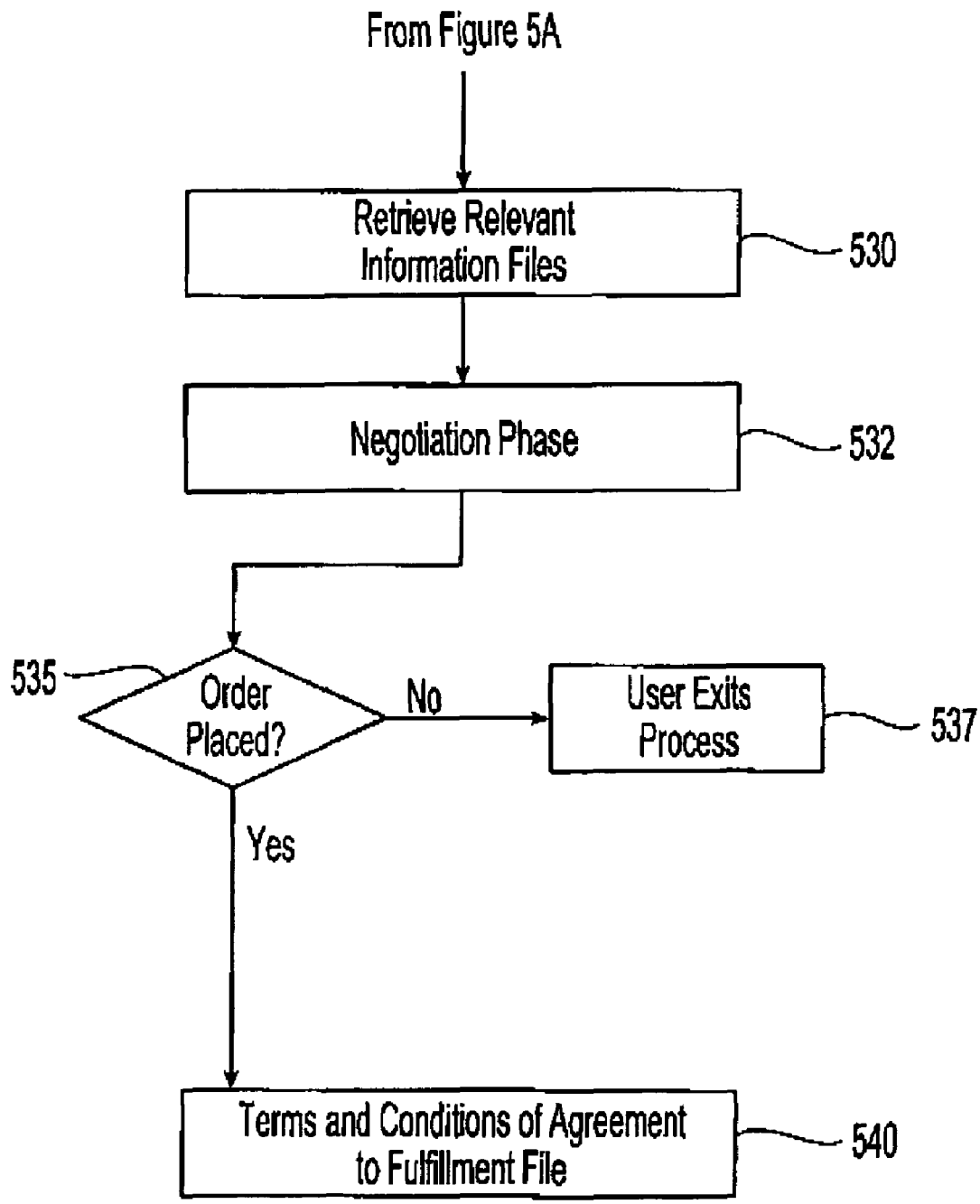

Referring now to FIG. 5, the method of engaging in a transaction will be described from the buyer's view point. As indicated in block 500, the user interface receives a request for a search of the common market. The common user interface presents a secondary interface that prompts the user for search terms, as indicated in block 505. The search terms are received from the user, as indicated in block 510. The secondary search interface then searches the data in the common market to locate the search terms, as indicated by block 515 If the common market contains listings according to the search terms secondary search interface presents the list of resource locators for these listings to the user, as indicated by block 520. The user interface receives an identification of resource locators as to which additional data is desired, as indicated by block 525. If the user wishes to view further information the secondary search interface then retrieves the relevant information files from the location where they are stored as shown by block 530. Any suitable data transfer protocol may be employed.

Once the information is received, the user may enter into negotiation with the seller, as indicated by block 532, or simply choose to place an order with the seller. If an order is placed the terms and conditions of agreement are forwarded to the fulfillment file for execution, as indicated by blocks 535 and 540. If no order is placed, the user exits the process as shown by block A record of all negotiations is maintained in the forum file and relevant information is maintained in the buyer's user profile in central clearinghouse. The system will then verify the buyer's ability to pay for the order. If a credit card purchase is involved, the central clearinghouse will check with the credit card issuer in the normal course. If the purchase involves merchant credit, the buyer's merchant credit will be verified at the central clearinghouse, and advised to the parties.

The information on merchant credit at the central clearinghouse may include the nature of users who are entitled to merchant credit, the length of time available to pay, available discounts, and other information. The buyer's user profile will be updated from time to time with payment history information. If payment is to be by electronic funds transfer, the buyer's EFT details will be checked and automatically included into the Order Form by the system. Prior arrangements will need to have been made with the banks involved to permit the central clearinghouse to verify the electronic funds transfer information. At the same time, if the system is compensated by a fee for each transaction, the system transaction fee should be calculated, and the system transaction fee and any other charges will be added to the order form. If the buyer is qualified to make either a merchant credit purchase or an EFT purchase, the system may issue a buyer approval number for the purchase that will be attached to the order form. The order form is then e-mailed to the buyer. If the buyer does not have the appropriate EFT arrangements in place, or does not have the merchant credit to purchase the order, the buyer should then be sent a cancellation advice informing the buyer of this and advising what the buyer must do to correct the buyer's position and effect such an order. The transaction is concurrently. The failed buyer must make the appropriate changes before the same buyer can place the order again.

Regardless of the nature of the transaction, a copy of the order form and any cancellation advice may also sent to the forum file of the product that generated the inquiry and to the forum file of the agent(s) involved (if any). Any calculated transaction fee payable to system should be sent to the system accounts file under accounts payable in the system forum file. All forms should carry appropriate disclaimers. For example, such disclaimers should protect the system from being liable for claims of buyers when sellers do not deliver. When seller receives an order form and is prompted to, seller should provide confirmation of product availability and terms and conditions of delivery. Seller may do this by completing the confirmation form attached to the order form.

Upon receiving confirmation from the seller, and before returning the order form to the buyer, the system may generate a seller confirmation number and attach this to the order form.

The system returns the completed order form to the buyer. A copy of the order form may also sent to the agreement file of the product that generated the transaction, to a forum file of the agent(s) involved (if any) and to a system accounts file located under accounts payable in the system master forum file. This indicates that this transaction has now been confirmed.

The next step in the process involves payment. The mechanics of payment vary depending on the type of payment. If the order is a credit card transaction, and the seller has the buyer's details, the seller can submit these to the appropriate bank for payment. No transaction fee is payable to system unless an arrangement exists with the credit card company.

If the order involves merchant credit, the payment arrangement (agreement) is filed in the forum file of the product that generated the inquiry and to the forum file of the agent(s) involved (if any). The time when the payment is due is also recorded in a file, the diary associated with the buyer's records in the central clearinghouse, an account for payment is generated from diary, at the end of each relevant period, such as once each month. The account for payment (including a copy of the order form) may then be sent to the buyer's bank for payment by electronic funds transfer (EFT), or direct to the buyer for payment by check. The amount of the transaction fee payable is included in the amount payable through the buyer's account.

Payment by check is not preferred by this system. However, users may want to use this method until they are comfortable with the on-line payment system. Where payment is to be made by check, the seller is responsible for paying the appropriate transaction fee to the system. The system will then need to settle with any agent(s). The agreement with agents will cover this.

If the order involves electronic funds transfer (EFT), the payment arrangement (agreement) is filed in the forum file of the product that generated this inquiry and to the file of the agent involved (if any). The time when the payment is due is then recorded in the diary maintained by the central clearinghouse and associated with the buyer and an account for payment is generated from the diary, at the end of each month, or other appropriate period, including this payment. The account for payment (including a copy of the order form) is then sent to the buyer's bank for payment by electronic funds transfer (EFT). The amount of the transaction fee payable is included on the order form.

It will be appreciated that the method and system of the invention provides a method and system which achieves the objectives set forth above under Summary of the Invention, as well as other objectives.

While the system and method of the invention have been described with respect to particular embodiments, there are other embodiments and variations which come within the scope and spirit of the present invention.

What is claimed is:

1. An electronic system for managing, processing and automating an electronic or digital activity, the system comprising:
    a common user interface that includes means for gathering and structuring data relating to activities into common database objects that are combinable to form a plurality of types of catalogs, lists, and workflows that are used to conduct electronic business;
    wherein said means for gathering and structuring data is included in a secondary interface;
    wherein said means for gathering and structuring data further uses a common data format; and
    wherein said common data format determines a design of the secondary interface and also an operating rule for creating, storing and processing data, in the form of database objects;
    wherein the common user interface enables the user to provide who/what information relating to the activity, why/how information relating to the activity, and where/when information relating to the activity, to be input to the system according to said common data format and the operating rule; and
    wherein said who/what, why/how and where/when information is input to the system through the secondary interface in a manner that conforms the common database objects to the said common data format and operating rule such that why information+how information=where/when information.

2. The system of claim 1, wherein said why information identifies the purpose of the activity, and said how and where/when information identifies details of a fulfillment process that enables the database objects to achieve the purpose thereof.

3. The system of claim 1, further comprising an output mode, wherein, when in said output mode the secondary interface of the system responds according to why information requests to cause said secondary interface in output mode to be automatically populated with information objects related to the why information request.

4. The system of claim 1, wherein a plurality of attributes and communications relating to the activity or an item are recorded as a composite file object, according to the said common data format and operating rule, and said attributes and communications define that activity or item in such a way that the activity can be automated and an item can be described.

5. The electronic system of claim 1, wherein said system further comprises a central clearinghouse for authorizing and authenticating a plurality of users of said system, said central clearinghouse being operable to maintain user identification records and control access for each of said plurality of users.

6. The electronic system of claim 5, wherein said system further comprises a common market permitting the users employing the system to advertise and locate propositions of interest and to connect to one another using the system.

7. The electronic system of claim 6, wherein all said users are linked to one another and the central clearinghouse and the common market by way of a virtual private network.

8. An electronic system for managing, processing, and automating electronic or digital activities, the system comprising:
    a common user interface that includes means for gathering and structuring data relating to said activities, including a description and meaning of the subject of said activities, through secondary interfaces, into database objects that are combinable to form catalogs, lists, workflows, and processes, that are used to conduct e-business;
    wherein said means for gathering and structuring data is a common data format that is also an operating rule of the system;
    wherein said operating rule is not only used for creating the database objects, but also for, storing, and processing the database objects;
    wherein the common data format enables the user to provide who/what type information relating to an activity, why/how information relating to the activity, and where/when information relating to the activity;
    wherein the who information identifies the name of the subject of the activity that may be substituted by a number, and the what information identifies the type of the activity or the subject of the activity;
    wherein said why information identifies the purpose of the activity, the how information and the where/when information identifies details of a fulfillment process; and
    wherein said who/what, why/how and where/when information when processed by the system, according to the operating rule, works so that why information+how information=where/when information, to achieve the purpose of the database objects.

9. The electronic system of claim 8, wherein said system further comprises a central clearinghouse for authorizing and authenticating a plurality of users of said system, said central clearinghouse being operable to maintain user identification records and control access for each of said plurality of users.

10. The electronic system of claim 9, wherein said system further comprises a common market permitting the users employing the system to advertise and locate propositions of interest and to connect to one another using the system.

11. The electronic system of claim 10, wherein at least some of said users are linked to one another and the central clearinghouse and the common market by way of a virtual private network.

* * * * *